United States Patent
Ga et al.

(10) Patent No.: US 11,905,393 B2
(45) Date of Patent: Feb. 20, 2024

(54) CELLULOSE ACETATE COMPOSITION AND MOLDED ARTICLE

(71) Applicant: DAICEL CORPORATION, Osaka (JP)

(72) Inventors: Kyokutou Ga, Tokyo (JP); Masahiko Suzuki, Tokyo (JP)

(73) Assignee: DAICEL CORPORATION, Osaka (JP)

(*) Notice: Subject to any disclaimer, the term of this patent is extended or adjusted under 35 U.S.C. 154(b) by 521 days.

(21) Appl. No.: 17/256,803

(22) PCT Filed: Jul. 18, 2019

(86) PCT No.: PCT/JP2019/028246
§ 371 (c)(1),
(2) Date: Dec. 29, 2020

(87) PCT Pub. No.: WO2020/031648
PCT Pub. Date: Feb. 13, 2020

(65) Prior Publication Data
US 2021/0363331 A1    Nov. 25, 2021

(30) Foreign Application Priority Data

Aug. 9, 2018  (JP) ................................. 2018-150229

(51) Int. Cl.
  *C08L 1/12* (2006.01)
  *A24D 3/17* (2020.01)
  (Continued)

(52) U.S. Cl.
  CPC .................. *C08L 1/12* (2013.01); *A24D 1/20* (2020.01); *A24D 3/02* (2013.01); *A24D 3/068* (2013.01);
  (Continued)

(58) Field of Classification Search
  None
  See application file for complete search history.

(56) References Cited

U.S. PATENT DOCUMENTS

| 2006/0058425 A1 | 3/2006 | Mohanty et al. |
| 2016/0032020 A1 | 2/2016 | Ukita et al. |

(Continued)

FOREIGN PATENT DOCUMENTS

| CN | 101827536 A | 9/2010 |
| CN | 105917038 A | 8/2016 |

(Continued)

OTHER PUBLICATIONS

Chinese Office Action and Search Report for Chinese Application No. 201980046772.X, dated Jan. 24, 2022, with English translation.

(Continued)

*Primary Examiner* — Fred M Teskin
(74) *Attorney, Agent, or Firm* — Birch, Stewart, Kolasch & Birch, LLP

(57) ABSTRACT

An object of the present invention is to provide a cellulose acetate composition with excellent biodegradability and water solubility, and excellent thermoformability. A cellulose acetate composition comprising: a cellulose acetate having a degree of acetyl substitution of 0.4 or greater and less than 1.4; and a citrate ester-based plasticizer, wherein a content of the citrate ester-based plasticizer is 3 parts by weight or greater per 100 parts by weight of the total amount of the cellulose acetate and the citrate ester-based plasticizer.

7 Claims, 1 Drawing Sheet

(51) Int. Cl.
  *A24D 1/20*   (2020.01)
  *A24D 3/02*   (2006.01)
  *A24D 3/06*   (2006.01)
  *A24D 3/10*   (2006.01)
  *A24D 3/14*   (2006.01)
  *C08B 3/06*   (2006.01)
  *C08J 5/18*   (2006.01)
  *C08K 5/11*   (2006.01)

(52) U.S. Cl.
  CPC .............. *A24D 3/10* (2013.01); *A24D 3/14* (2013.01); *A24D 3/17* (2020.01); *C08B 3/06* (2013.01); *C08J 5/18* (2013.01); *C08K 5/11* (2013.01); *C08J 2301/12* (2013.01); *C08L 2203/16* (2013.01); *C08L 2203/30* (2013.01); *C08L 2205/06* (2013.01)

(56) References Cited

U.S. PATENT DOCUMENTS

2016/0270437 A1    9/2016   Nappi
2016/0333500 A1   11/2016   Shimamoto et al.

FOREIGN PATENT DOCUMENTS

| | | |
|---|---|---|
| EP | 1 057 858 A2 | 12/2000 |
| EP | 3 312 227 A1 | 4/2018 |
| GB | 2489491 A | 10/2012 |
| JP | 2001-48840 A | 2/2001 |
| JP | 2015-503335 A | 2/2015 |
| JP | 2015/-140432 A | 8/2015 |
| JP | 2017-500021 A | 1/2017 |
| WO | WO 2009/037461 A2 | 3/2009 |
| WO | WO 2013/098405 A2 | 7/2013 |
| WO | WO 2014/198815 A1 * 12/2014 .............. A24D 3/02 |
| WO | WO 2016/203657 A1 | 12/2016 |

OTHER PUBLICATIONS

Office Action dated Jun. 28, 2022, in Japanese Patent Application No. 2018-150229.
Extended European Search Report for European Application No. 19846478.6, dated Apr. 11, 2022.
English translation of the Written Opinion of the International Searching Authority for International Application No. PCT/JP2019/028246, dated Aug. 13, 2019.

* cited by examiner

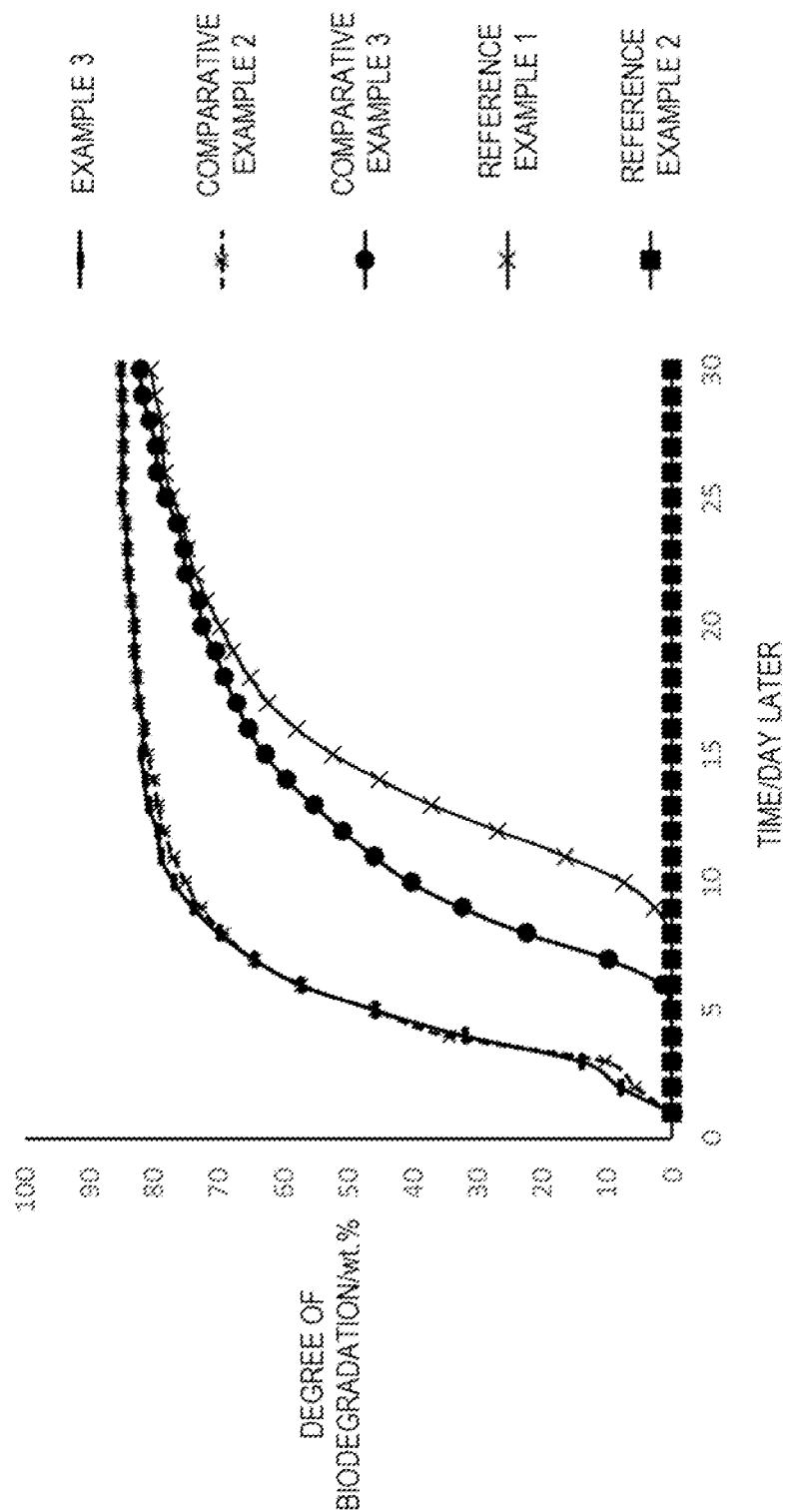

CELLULOSE ACETATE COMPOSITION AND MOLDED ARTICLE

TECHNICAL FIELD

The present invention relates to a cellulose acetate composition and a molded article.

BACKGROUND ART

In recent years, there has been an increased demand for Reduced Risk Products that do not use fire, compared to the conventional cigarette. Reduced Risk Products are generally divided into two types: with one type (an e-cigarette), a solution that contains nicotine dissolved in an organic solvent is heated and the resulting aerosol or gas is inhaled by a user; and with another type (a heated tobacco product), tobacco leaves (the tobacco leaves including artificial tobacco leaves such as processed tobacco leaves or substrates impregnated with a tobacco component) are heated (but not burned) and then the diffusing nicotine-containing aerosol is inhaled by a user. However, in Japan, nicotine itself is designated as a pharmaceutical product, and the handling of nicotine is regulated. For example, the sale of nicotine is prohibited, in principle. In such cases, the e-cigarette, with which a solution that contains nicotine dissolved in an organic solvent is heated and the resulting aerosol or gas is inhaled, cannot be sold. Further, the e-cigarette is designated as a pharmaceutical product also in many countries besides Japan. Note that iQOS (trade name), available from Philip Morris International Inc., is a heated tobacco product with which tobacco leaves of a dedicated cigarette are heated and then the diffusing nicotine-containing aerosol is inhaled by a user.

Patent Document 1 describes, as an example of a cigarette for use in a heated tobacco product, one having a structure in which a mouthpiece, an aerosol-cooling element, a support element, and an aerosol-forming substrate are arranged in this order from a side close to a mouth-end, and also describes that the cigarette includes a cellulose acetate tow filter as the mouthpiece, a polylactic acid sheet as the aerosol-cooling element, a hollow cellulose acetate tube as the support element, and tobacco as the aerosol-forming substrate.

In the case of heated tobacco products in which tobacco leaves is heated, members other than the tobacco leaves of a dedicated cigarette remain after smoking is finished. Thus, environment issues can arise due to the remaining members being thrown away. To address the environment issues, a biodegradable polylactic acid is used as a material for a cooling part of the cigarette for use in a heated tobacco product, as described above.

From the perspective of excellent biodegradability, in general, cellulose acetates that are used in cellulose acetate tow filters and cellulose acetate tubes preferably have a lower degree of acetyl substitution, but must have a certain degree of acetyl substitution because of ease of processing by thermoforming and less influences on the flavor. Furthermore, additives such as a plasticizer may be added to a cellulose acetate for the purpose of achieving superior thermoformability and physical properties (Patent Document 2, 3 and 4).

CITATION LIST

Patent Document

Patent Document 1: JP 2015-503335 A
Patent Document 2: WO 2016/203657
Patent Document 3: JP 2015-140432 A
Patent Document 4: JP 2001-048840

SUMMARY OF INVENTION

Technical Problem

Patent Document 2 describes addition of polyvinyl alcohol to a cellulose acetate having a total degree of acetyl substitution ranging from 0.4 to 1.6. Patent Document 3 describes that polyethylene glycol is used as a plasticizer to be added to a cellulose acetate having a degree of acetyl substitution ranging from 0.5 to 1.0.

However, cigarette filters in a related art and the respective elements of heated tobacco products (smoking-related elements including an element for use in a mouth-end such as a cellulose acetate tow filter, an element as an aerosol-cooling element, and an element as a support element such as a hollow cellulose acetate tube) may impair the smoke flavor, when polyvinyl alcohol or polyethylene glycol is added thereto.

The polyethylene glycol changes its state depending on the degree of polymerization, and has a liquid form in the case of a low degree of polymerization and a solid form in the case of a high degree of polymerization, at room temperature.

A liquid-form polyethylene glycol is preferred because of being easily dispersed uniformly in a cellulose acetate, but easily bleeds out from the cellulose acetate. A solid-form polyethylene glycol arouses a concern about difficulty in uniformly dispersing in a cellulose acetate. Thus, it is not substantially easy to handle the polyethylene glycol as a plasticizer for cellulose acetates.

In addition, Patent Document 4 describes a cellulose acetate-based resin composition containing a citrate ester compound, and also describes that the cellulose acetate-based resin has a degree of acetylation from 40.03 to 62.55%, i.e., a degree of substitution from 1.5 to 3.0. However, such a cellulose acetate-based resin composition has inferior water solubility.

Known methods of adding a plasticizer can increase the thermoformability of cellulose acetates, but cannot achieve both the biodegradability and thermoformability of the resulting cellulose acetate compositions. An object of the present invention is to provide a cellulose acetate composition with excellent biodegradability and water solubility, and excellent thermoformability.

Solution to Problem

A first aspect of the present invention relates to a cellulose acetate composition including: a cellulose acetate having a degree of acetyl substitution of 0.4 or greater and less than 1.4; and a citrate ester-based plasticizer, wherein a content of the citrate ester-based plasticizer is 3 parts by weight or greater per 100 parts by weight of the total amount of the cellulose acetate and the citrate ester-based plasticizer.

In the cellulose acetate composition, the citrate ester-based plasticizer may be at least one type selected from the group consisting of triethyl citrate and acetyl triethyl citrate.

In the cellulose acetate composition, the cellulose acetate may have a degree of acetyl substitution of 0.4 or greater and 1.1 or less.

In the cellulose acetate composition, the cellulose acetate composition may be for thermoforming.

A second aspect of the present invention relates to a molded article formed by molding the cellulose acetate composition.

The molded article may be a film.

The molded article may have a hollow cylindrical shape.

The molded article may be a cigarette member of a heated tobacco product.

Advantageous Effects of Invention

The present invention can provide a cellulose acetate composition with excellent biodegradability and water solubility, and excellent thermoformability.

BRIEF DESCRIPTION OF DRAWINGS

The FIGURE is a graph showing the measurement results of the degree of biodegradation (wt. %).

DESCRIPTION OF EMBODIMENTS

[Cellulose Acetate Composition]

The cellulose acetate composition of the present disclosure contains a cellulose acetate having a degree of acetyl substitution of 0.4 or greater and less than 1.4; and a citrate ester-based plasticizer, and a content of the citrate ester-based plasticizer is 3 parts by weight or greater per 100 parts by weight of the total amount of the cellulose acetate and the citrate ester-based plasticizer.

[Cellulose Acetate]

(Degree of Acetyl Substitution)

The cellulose acetate included in the cellulose acetate composition of the present disclosure has a degree of acetyl substitution of 0.4 or greater and less than 1.4, preferably 0.4 or greater and 1.1 or less, and more preferably 0.7 or greater and 1.0 or less. When the degree of acetyl substitution falls within this range, the cellulose acetate composition of the present disclosure has better biodegradability than that of cellulose, and also excellent water solubility and thermoformability.

The excellent thermoformability specifically means, for example, that the melt state of a melt can be adjusted to a range suitable for thermoforming, i.e., the melting viscosity can be adjusted to a range suitable for thermoforming.

Also, in the present disclosure, the thermoforming means an operation of heating a material to induce its plasticity at such a level that the material can be deformed, and cooling the material to form the material into a predetermined shape, and examples of thermoforming methods include heat compression molding, melt extrusion molding, and injection molding.

On the other hand, a cellulose acetate composition obtained when the degree of acetyl substitution is less than 0.4 is inferior in biodegradability, water solubility, and thermoformability. In addition, when the degree of acetyl substitution is 1.4 or greater, the biodegradability tends to be inferior.

The degree of acetyl substitution of the cellulose acetate can be measured by a known titration method in which a cellulose acetate is dissolved in an appropriate solvent according to the degree of substitution and the degree of substitution of the cellulose acetate is determined. The degree of acetyl substitution can also be measured by NMR according to the Tezuka's method (Tezuka, Carbonydr. Res. 273, 83 (1995)) involving converting hydroxyl groups of a cellulose acetate into completely-derivatized cellulose acetate propionate (CAP), and then dissolving the cellulose acetate propionate in deuterated chloroform.

Furthermore, the degree of acetyl substitution is determined by measuring a combined acetic acid according to the method for measuring the combined acetic acid in ASTM: D-817-91 (Testing methods for cellulose acetate, etc.) and converting the measured combined acetic acid according to the following equation. This is the most common procedure to determine the degree of substitution of cellulose acetate.

$$DS = 162.14 \times AV \times 0.01/(60.052 - 42.037 \times AV \times 0.01)$$

where DS represents a degree of acetyl substitution; and AV represents a combined acetic acid (%)

First, 500 mg of a dried cellulose acetate (sample) is precisely weighed and dissolved in 50 ml of a mixed solvent of ultrapure water and acetone (volume ratio: 4:1), and then 50 ml of a 0.2 N aqueous sodium hydroxide solution is added to saponify the cellulose acetate at 25° C. for 2 hours. Next, 50 ml of 0.2 N hydrochloric acid is added, and an amount of acetic acid released is titrated with a 0.2 N aqueous sodium hydroxide solution (0.2 N normal sodium hydroxide solution) using phenolphthalein as an indicator. Also, a blank test (test without using any sample) is performed by the same method. AV (combined acetic acid) (%) is then calculated according to the following equation:

$$AV(\%) = (A-B) \times F \times 1.201/\text{sample weight}(g)$$

wherein
A represents a titration volume (ml) of 0.2 N normal sodium hydroxide solution;
B represents a titration volume (ml) of 0.2 N normal sodium hydroxide solution in blank test; and
F represents factor of 0.2 N normal sodium hydroxide solution.

In the present disclosure, the degree of acetyl substitution can be referred to also as a total degree of acetyl substitution, i.e., a sum of average degrees of acetyl substitution at the 2-, 3-, and 6-positions of the glucose ring of the cellulose acetate.

(Compositional Distribution Index (CDI))

The cellulose acetate contained in the cellulose acetate composition of the present disclosure has a compositional distribution index (CDI) of 3.0 or less (e.g., ranging from 1.0 to 3.0). The compositional distribution index (CDI) is preferably 2.8 or less, 2.0 or less, 1.8 or less, 1.6 or less, and even 1.3 or less. The lower limit value is not particularly limited, but may be 1.0 or greater.

When calculated, the lower limit of the compositional distribution index (CDI) is 0. This is achieved with special synthetic techniques such as a technique in which only the 6-position of the glucose residue is acetylated with a selectivity of 100% while no other position is acetylated. However, such synthesis techniques have not yet been known. In a situation where all the hydroxyl groups of the glucose residue are acetylated and deacetylated with the same probability, the CDI will be 1.0. However, considerable ingenuity is required to realize a compositional distribution close to such an ideal state in an actual cellulose reaction. In the prior art, not so much attention has been paid to such control of compositional distribution.

The cellulose acetate has a small compositional distribution index (CDI) and a uniform compositional distribution (intermolecular substitution degree distribution), and thus the cellulose acetate composition of the present disclosure has superior thermoformability.

Here, the compositional distribution index (CDI) is defined as a ratio of the measured value of a half-height width of compositional distribution to the theoretical value of the half-height width of compositional distribution [(Measured value of half-height width of compositional distribution)/(Theoretical value of half-height width of compositional distribution]. The half-height width of compositional distribution is referred to also as "half-height width of intermolecular substitution degree distribution" or referred to simply as "half-height width of substitution degree distribution".

To evaluate the uniformity of the degree of acetyl substitution of a cellulose acetate, the magnitude of a half-height width of a maximum peak in an intermolecular substitution degree distribution curve (also referred to as "half-height width") of the cellulose acetate can be used as an indicator. The half-height width is a width of a peak at a half-height of the peak in the chart, when the abscissa axis (x-axis) represents a degree of acetyl substitution and the ordinate axis (y-axis) represents an abundance at this degree of substitution. Also, the half-height width is an index as a measure of the dispersion in the distribution. The half-height width of compositional distribution (half-height width of substitution degree distribution) can be determined by high performance liquid chromatography (HPLC) analysis. A method of converting the abscissa axis (elution time) in an elution curve of a cellulose ester in HPLC into a degree of substitution (from 0 to 3) is described in JP 2003-201301 A (paragraphs to [0040]).

(Theoretical Value of Half-Height Width of Compositional Distribution)

The theoretical value of the half-height width of compositional distribution (half-height width of substitution degree distribution) can be calculated stochastically. That is, the theoretical value of the half-height width of compositional distribution is determined according to Equation (1) below:

[Equation 1]

$$\text{Theoretical value of half-height width of compositional distribution} = 2.35482\sqrt{mpq}\,/DPw \quad (1)$$

where
m is a total number of hydroxyl groups and acetyl groups in one molecule of cellulose acetate;
p is a probability of acetyl substitution of hydroxyl groups in one molecule of cellulose acetate;
q=1−p; and
DPw represents a weight average degree of polymerization (a value determined by GPC-light scattering method using cellulose acetate propionate obtained by propionylating all residual hydroxyl groups of cellulose acetate).

Furthermore, the theoretical value of the half-height width of compositional distribution is expressed by the degree of substitution and the degree of polymerization as follows. Equation (2) below is a definition equation for determining the theoretical value of the half-height width of compositional distribution:

[Equation 2]

$$\text{Theoretical value of half-height width of compositional distribution} = 2.35482\sqrt{3*DPw*(DS/3)*(1-DS/3)}\,/DPw \quad (2)$$

where DS represents a degree of acetyl substitution; and
DPw represents a weight average degree of polymerization (a value determined by GPC-light scattering method using cellulose acetate propionate obtained by propionylating all residual hydroxyl groups of cellulose acetate).

More strictly, for Equations (1) and (2), the polymerization degree distribution should be taken into consideration. In this case, the "DPw" in Equations (1) and (2) should be replaced with the function of the polymerization degree distribution, and the entire equations should be integrated from a degree of polymerization of 0 to infinity. However, Equations (1) and (2) give a theoretical value with an approximately sufficient precision, as long as they employ DPw. If DPn (number average degree of polymerization) is employed, the effect of the polymerization degree distribution would not be negligible. So, DPw should be employed.

(Measured Value of Half-Height Width of Compositional Distribution)

In the present disclosure, the measured value of the half-height width of compositional distribution is a half-height width of compositional distribution determined by HPLC analysis of a cellulose acetate propionate obtained by propionylating all residual hydroxyl groups (unsubstituted hydroxyl groups) of a cellulose acetate (sample).

In general, high performance liquid chromatography (HPLC) analysis can be performed on a cellulose acetate having a degree of acetyl substitution ranging from 2 to 3 without pretreatment, and thus the half-height width of compositional distribution can be determined. For example, JP 2011-158664 A describes a compositional distribution analysis method for a cellulose acetate having a degree of substitution from 2.27 to 2.56.

On the other hand, the measured value of the half-height width of compositional distribution (half-height width of substitution degree distribution) is determined by derivatizing residual hydroxyl groups in the molecule of the cellulose acetate as a pretreatment prior to HPLC analysis, and then performing the HPLC analysis. The purpose of this pretreatment is to convert the cellulose acetate having a low degree of substitution into a derivative that is easily dissolved in an organic solvent to enable the HPLC analysis. That is, the residual hydroxyl groups in the molecule are completely propionylated, and the completely-derivatized cellulose acetate propionate (CAP) is subjected to the HPLC analysis to determine the half-height width of compositional distribution (measured value). The derivatization should be completely performed, and, therefore, no residual hydroxyl group is present in the molecule and only the acetyl groups and propionyl groups are present in the molecule. That is, the sum of the degree of acetyl substitution (DSac) and the degree of propionyl substitution (DSpr) is 3. This is because the relational expression: DSac+DSpr=3 is used to create a calibration curve to convert the abscissa axis (elution time) of the HPLC elution curve of the CAP into a degree of acetyl substitution (from 0 to 3).

The complete derivatization of a cellulose acetate can be accomplished by allowing a propionic anhydride to act on the cellulose acetate using N,N-dimethylaminopyridine as a catalyst in a pyridine/N,N-dimethylacetamide mixed solvent. More specifically, propionylation is performed under the following conditions: a temperature of 100° C. and a reaction time from 1.5 to 3.0 hours, using a mixed solvent [pyridine/N,N-dimethylacetamide=1/1 (v/v)] as a solvent in an amount of 20 parts by weight relative to a cellulose acetate (sample), a propionic anhydride as a propionylating agent in an amount from 6.0 to 7.5 equivalents relative to hydroxyl groups of the cellulose acetate, and N,N-dimethylaminopyridine as a catalyst in an amount from 6.5 to 8.0 mol % relative to the hydroxyl groups of the cellulose acetate. Then, after the reaction, the reaction mixture is subjected to precipitation using methanol as a precipitation solvent to yield a completely-derivatized cellulose acetate propionate. More specifically, the completely-derivatized cellulose acetate propionate (CAP) can be obtained by, for example, charging 1 part by weight of the reaction mixture into 10 parts by weight of methanol to perform precipitation, washing the resulting precipitates with methanol five times, and vacuum-drying the precipitates at 60° C. for 3 hours. Note that the weight average degree of polymerization (DPw) is also measured by converting the cellulose acetate (sample) into a completely-derivatized cellulose acetate propionate (CAP) by this method.

In the HPLC analysis described above, a plurality of cellulose acetate propionates having different degrees of acetyl substitutions are used as standard samples to perform HPLC analysis using a predetermined measurement apparatus under measurement conditions; the analytical values of these standard samples are used to create a calibration curve [a curve indicating the relationship between the elution time and the degree of acetyl substitution (from 0 to 3) of cellulose acetate propionates, normally, a cubic curve]; and the half-height width of compositional distribution (measured value) of the cellulose acetate (sample) can be determined from the calibration curve. The HPLC analysis above can determine the relationship between the elution time and the acetyl substitution degree distribution of cellulose acetate propionates. This is the relationship between the elution time and the acetyl substitution degree distribution of a substance in which all the residual hydroxyl groups in the sample molecule have been converted into propionyloxy groups. Therefore, the determination is, essentially, not different from the determination of the acetyl substitution degree distribution of the cellulose acetate of the present disclosure.

The conditions for the HPLC analysis are as follows.
Apparatus: Agilent 1100 Series
Column: Waters Nova-Pak Phenyl 60 Å 4 μm (150 mm×3.9 mm Φ)+guard column
Column temperature: 30° C.
Detection: Varian 380-LC
Injection volume: 5.04 (sample concentration: 0.1% (wt/vol))
Eluents: Eluent A: MeOH/$H_2O$=8/1 (v/v), Eluent B: $CHCl_3$/MeOH=8/1 (v/v)
Gradient: A/B=80/20→0/100 (28 min.); Flow rate: 0.7 mL/min.

In the substitution degree distribution curve determined from the calibration curve [substitution degree distribution curve of the cellulose acetate propionate, with the abundance of the cellulose acetate propionate on the ordinate axis and the degree of acetyl substitution on the abscissa axis] (referred to also as "intermolecular substitution degree distribution curve"), the half-height width of substitution degree distribution is determined, on a maximum peak (E) corresponding to the average degree of substitution, as follows. A base line (A-B) tangent to a base (A) on a low substitution degree side of the peak (E) and a base (B) on a high substitution degree side thereof is drawn, and a perpendicular line is drawn from the maximum peak (E) toward the abscissa axis, with respect to the base line. An intersection (C) between the perpendicular line and the base line (A-B) is determined, and a midpoint (D) between the maximum peak (E) and the intersection (C) is determined. A straight line parallel to the base line (A-B) is drawn through the midpoint (D) to determine two intersections (A', B') with the intermolecular substitution degree distribution curve. Perpendicular lines are drawn from the two intersections (A', B') to the abscissa axis, and a width between the two intersections on the abscissa axis is taken as the half-height width of maximum peak (i.e., half-height width of substitution degree distribution).

Such a half-height width of substitution degree distribution reflects the fact that the retention times of the molecular chains of cellulose acetate propionates in the sample are different depending on the level of acetylation of hydroxyl groups of glucose rings of individual polymer chains constituting the molecular chains of the cellulose acetate propionates. Ideally, the width of retention time indicates the width of compositional distribution (in the substitution degree unit). However, in HPLC, a tube part that does not contribute to the distribution (such as a guide column for protecting a column) exists. Therefore, due to the configuration of the measurement apparatus, the width of retention time that is caused not by the width of compositional distribution is often included as an error. This error is affected by the length and inner diameter of the column, the length and routing of piping from the column to the detector, etc., and varies dependent on the device configuration, as described above. Therefore, the half-height width of substitution degree distribution of the cellulose acetate propionate can normally be determined as corrected value Z based on a correction formula represented by the following formula. Using such a correction formula, it is possible to determine a more accurate half-height width of substitution degree distribution (measured value) as the same (almost the same) value even if different measurement apparatuses (and measurement conditions) are used.

$$Z=(X^2-Y^2)^{1/2}$$

where X represents a half-height width of substitution degree distribution (uncorrected value) determined by a predetermined measurement apparatus under predetermined measurement conditions; and $Y=(a-b)\times/3+b$ ($0\leq x\leq 3$) where "a" represents an apparent half-height width of substitution degree distribution of a cellulose acetate with a degree of substitution of 3 determined by the same measurement apparatus under the same measurement conditions as those for the X described above (in fact, no substitution degree distribution exists because the degree of substitution is 3); and b represents an apparent half-height width of substitution degree distribution of a cellulose propionate with a degree of substitution of 3 determined by the same measurement apparatus under the same measurement conditions as those for the X described above; and x represents a degree of acetyl substitution of the measurement sample ($0\leq x\leq 3$).

Note that the cellulose acetate (or cellulose propionate) with a degree of substitution of 3 refers to a cellulose ester in which all the hydroxyl groups of the cellulose are esterified, and, in fact, which does not have (ideally) a half-height width of substitution degree distribution (i.e., a half-height width of substitution degree distribution of 0).

The above-described theoretical formula of substitution degree distribution gives a stochastically calculated value on the assumption that all acetylation and deacetylation proceed independently and evenly. That is, it gives a calculated value according to a binomial distribution. Such an ideal situation cannot occur, realistically. Considerable ingenuity is required to realize the hydrolysis reaction of the cellulose acetate close to an ideal random reaction and/or fractionation in the composition in post-treatment after the reaction. Otherwise, the substitution degree distribution of the cellulose ester is significantly wider than that stochastically determined according to the binomial distribution.

One possible particular approach to such a reaction is to maintain the system under conditions in which deacetylation and acetylation are in equilibrium, for example. However, in this case, cellulose decomposition progresses due to an acid catalyst, which is not preferable. Another possible approach to such a reaction is to employ reaction conditions under which the deacetylation rate is slow for cellulose esters having a low degree of substitution. However, such a specific method has not yet been known. That is, there is no known particular approach for the reaction to control the substitution degree distribution of the cellulose ester according to the binomial distribution, as per reaction probability theories. Furthermore, various circumstances, such as non-uniformity of the acetylation process (cellulose acetylation) and occurrence of partial or temporary precipitation due to water that is added stepwise during the aging process (cellulose acetate hydrolysis), cause the substitution degree distribution to be wider than the binominal distribution. It is realistically impossible to avoid all of them and realize ideal conditions. This resembles the fact that an ideal gas is just an ideal product and that an actually existing gas behaves, more or less, differently from the ideal gas.

In the known synthesis and post-treatment of a cellulose acetate having a low degree of substitution, little attention has been paid to such problems of the substitution degree distribution, and the substitution degree distribution has not been measured, verified or considered. For example, the literature (Journal of the Society of Fiber Science and Technology, 42, p. 25 (1986)) argues that the solubility of a cellulose acetate with a low degree of substitution is determined by the distribution of acetyl groups to the 2-, 3-, and 6-positions of glucose residue, and gives no consideration for the compositional distribution.

According to the present disclosure, surprisingly, the substitution degree distribution of a cellulose acetate can be controlled by an approach for post-treatment conditions after the hydrolysis of the cellulose acetate, as will be described below. The literatures (CiBment, L., and Rivibre, C., Bull. SOC. chim., (5) 1, 1075 (1934); Sookne, A. M., Rutherford, H. A., Mark, H., and Harris, M. J., Research Natl. Bur. Standards, 29, 123 (1942); and A. J. Rosenthal, B. B. White, Ind. Eng. Chem., 1952, 44 (11), pp. 2693-2696) describe that, in the precipitation fractionation of a cellulose acetate having a degree of substitution of 2.3, molecular weight-dependent fractionation and slight fractionation associated with the degree of substitution (chemical composition) occur, and do not report that the degree of substitution (chemical composition) can provide significant fractionation, as disclosed herein. Furthermore, it has not been verified that the substitution degree distribution (chemical composition) of a cellulose acetate having a low degree of substitution can be controlled by dissolution fractionation or precipitation fractionation, as in the present disclosure.

Another approach to narrow the substitution degree distribution found by the present inventors is a hydrolysis reaction (aging reaction) of a cellulose acetate at a high temperature of 90° C. or higher (or higher than 90° C.). In the prior art, the details of the degree of polymerization of a product obtained through a high temperature reaction have not been analyzed or considered. Nevertheless, it has been said that cellulose decomposition preferentially occurs in a high temperature reaction at 90° C. or higher. This idea can be said to be an assumption (stereotype) based solely on the consideration for viscosity. The present inventors have found that, when a cellulose acetate is hydrolyzed to give a cellulose acetate with a low degree of substitution, the cellulose acetate is reacted in a large amount of acetic acid at a high temperature of 90° C. or higher (or higher than 90° C.) preferably in the presence of a strong acid such as sulfuric acid, and thus that the cellulose acetate does not show a reduction in degree of polymerization, but shows a reduction in viscosity together with a reduction in CDI. That is, the present inventors have elucidated that the reduction in viscosity associated with the high temperature reaction is caused not by the reduction in degree of polymerization, but by the reduction in structural viscosity due to a narrow substitution degree distribution. When a cellulose acetate is hydrolyzed under the conditions described above, not only a forward reaction, but also a reverse reaction occurs. So, the CDI of the product (cellulose acetate with a low degree of substitution) is a very small value. When the cellulose acetate is used to form the cellulose acetate composition of the present disclosure, the melt state is stable (in other words, the melting viscosity can be adjusted within a range suitable for thermoforming), and particularly excellent thermoformability can be achieved. In contrast, when the cellulose acetate is hydrolyzed under conditions in which the reverse reaction is unlikely to occur, the degree of substitution distribution becomes wider due to various factors. When the cellulose acetate is used to form the cellulose acetate composition of the present disclosure, the melt state is unlikely to be stable, and good thermoformability may not be obtained.

(Weight Average Degree of Polymerization (DPw))

The weight average degree of polymerization (DPw) is a value determined by a GPC-light scattering method using a cellulose acetate propionate obtained by propionylating all residual hydroxyl groups of the cellulose acetate (sample).

The weight average degree of polymerization (DPw) of the cellulose acetate of the present disclosure is preferably in the range of from 100 to 1000. When the weight average degree of polymerization (DPw) is too low, the thermoformability tends to be inferior. When the weight average degree of polymerization (DPw) is too high, the biodegradability tends to be inferior. The weight average degree of polymerization (DPw) is preferably from 100 to 800, and more preferably from 200 to 700.

The weight average degree of polymerization (DPw) is determined by converting a cellulose acetate (sample) into a completely-derivatized cellulose acetate propionate (CAP) by a method similar to that employed when determining the measured value of the half-height width of compositional distribution, and then subjecting the completely-derivatized cellulose acetate propionate (CAP) to size exclusion chromatography analysis (GPC-light scattering method).

As described above, the degree of polymerization (molecular weight) of the cellulose acetate is measured by the GPC-light scattering method (GPC-MALLS, GPC-LALLS, etc.). The cellulose acetate varies in solubility in the solvent depending on the degree of substitution. So, when the degrees of polymerization at a wide range of degrees of substitution are measured, the degrees of polymerization may have to be measured using different solvent systems and compared. One effective way to avoid this problem is to derivatize the cellulose acetate, dissolve the derivatized cellulose acetate in the same organic solvent, and subject it to GPC-light scattering measurement using the same organic solvent. Propionylation is effective for the derivatization of the cellulose acetate of interest, and specific reaction conditions and post-treatment are as explained in the above description of the measured value of the half-height width of compositional distribution.

(Molecular Weight Distribution Mw/Mn)

The molecular weight distribution (molecular weight distribution Mw/Mn obtained by dividing the weight average molecular weight Mw by the number average molecular weight Mn) of the cellulose acetate of the present disclosure is preferably 3.0 or less and 1.8 or greater, more preferably 2.5 or less and 1.9 or greater, and even more preferably 2.4 or less and 2.0 or greater. When the molecular weight distribution Mw/Mn is greater than 3.0 or less than 1.8, the molding stability of a molded article (for example, physical stability such as dimensional stability and strength of the molded article; more specifically, examples of the stability include the following properties: unnecessary irregularities are less likely to be produced on the surface of the molded article; voids are less likely to be produced inside the molded article; the variation in mechanical strength throughout the molded article is small; and deformation is less likely to occur in a short period of time immediately after molding) is deteriorated. When the molecular weight distribution of the cellulose acetate is 3.0 or less and 1.8 or greater, good thermoformability can be achieved.

The number average molecular weight (Mn), weight average molecular weight (Mw), and molecular weight distribution (Mw/Mn) of the cellulose acetate can be determined by known methods using HPLC. In the present disclosure, the molecular weight distribution (Mw/Mn) of the cellulose acetate is determined by converting a cellulose acetate (sample) into a completely-derivatized cellulose acetate propionate (CAP) by a method similar to that employed when determining the measured value of the half-height width of compositional distribution, for the purpose of making a measurement sample soluble in an organic solvent, and then subjecting the completely-derivatized cellulose acetate propionate (CAP) to size exclusion chromatography analysis under the following conditions (GPC-light scattering method).

Apparatus: "SYSTEM-21H", GPC available from Shodex
Solvent: acetone
Column: two GMHxl columns (Tosoh Corporation), same guard column
Flow rate: 0.8 ml/min.
Temperature: 29° C.
Sample concentration: 0.25% (wt/vol)
Injection volume: 100 μl
Detection: MALLS (multi-angle light scattering detector) ("DAWN-EOS" available from Wyatt Technology Corporation)
Reference material for MALLS calibration: PMMA (molecular weight: 27600)

The molecular weight distribution can be calculated from the weight average molecular weight and number average molecular weight obtained from the measurement results, according to the following equation:

$$\text{Molecular weight distribution} = Mw/Mn$$

where
Mw represents the weight average molecular weight; and
Mn represents the number average molecular weight.

[Citrate Ester-Based Plasticizer]

The citrate ester-based plasticizer included in the cellulose acetate composition of the present disclosure is not particularly limited as long as it is an ester compound of citric acid.

The addition of the citrate ester-based plasticizer to the cellulose acetate of the present disclosure can efficiently lower the glass transition temperature of the resulting cellulose acetate composition, thereby making it possible to easily melt the cellulose acetate composition by heating and to impart excellent thermoformability to the cellulose acetate.

The citrate ester-based plasticizer content of the cellulose acetate composition of the present disclosure is 3 parts by weight or greater per 100 parts by weight of the total amount of the cellulose acetate and the citrate ester-based plasticizer. The upper limit is not particularly limited, but is preferably 5 parts by weight or greater and 40 parts by weight or less, more preferably 10 parts by weight or greater and 35 parts by weight or less, even more preferably 15 parts by weight or greater and 30 parts by weight or less, and most preferably 20 parts by weight or greater and 30 parts by weight or less. When the content is less than 3 parts by weight, thermoformability may not be imparted to the cellulose acetate sufficiently. When the content is greater than 40 parts by weight, the citrate ester-based plasticizer may be likely to bleed out.

The citrate ester-based plasticizer is obtained by condensation of citric acid with an alcohol. Such an alcohol may be a monohydric alcohol or a polyhydric alcohol that is divalent or higher.

The citrate ester-based plasticizer may be at least one type selected from the group consisting of triethyl citrate, acetyl triethyl citrate, tributyl citrate, acetyl tributyl citrate, and acetyl 2-ethylhexyl citrate. Among these substances, at least one type selected from the group consisting of triethyl citrate and acetyl triethyl citrate is preferred.

At least one type of citrate ester-based plasticizer selected from the group consisting of triethyl citrate and acetyl triethyl citrate is also excellent in solubility in water, and thus contributes to excellent water solubility of the cellulose acetate composition of the present disclosure. Note that other citrate ester-based plasticizers can also be suitably used as the citrate ester-based plasticizer of the present disclosure as long as they are water soluble.

In addition, at least one type of citrate ester-based plasticizer selected from the group consisting of triethyl citrate and acetyl triethyl citrate is unlikely to bleed out from the cellulose acetate composition, is liquid at room temperature, is easily dispersed uniformly in the cellulose acetate, and therefore can be handled easily as a plasticizer.

Furthermore, even when the cellulose acetate composition of the present disclosure is heated, at least one type of citrate ester-based plasticizer selected from the group consisting of triethyl citrate and acetyl triethyl citrate has a tendency to remain in the composition relatively easily, and the composition is excellent in stability of physical properties and in ease of handling.

At least one type of citrate ester-based plasticizer selected from the group consisting of triethyl citrate and acetyl triethyl citrate is a component recognized as safe for human intake and easily undergoes biodegradation, and thus has a small environmental load. In addition, the cellulose acetate composition obtained by adding a citrate ester-based plasticizer to the cellulose acetate of the present disclosure has improved biodegradability as compared with that in the case where the cellulose acetate is used alone.

As described above, at least one type of citrate ester-based plasticizer selected from the group consisting of triethyl citrate and acetyl triethyl citrate is safe even when taken by a person and can impart excellent thermoformability to a cellulose acetate, and thus can also be used as a capsule material for drug delivery used in so-called drag delivery systems. In addition, the cellulose acetate composition obtained by adding at least one type of citrate ester-based plasticizer selected from the group consisting of triethyl citrate and acetyl triethyl citrate to the cellulose acetate, even when used as a tobacco member, has no risk of ruining the flavor of tobacco.

The cellulose acetate composition of the present disclosure has excellent thermoformability and is thus suitable for thermoforming.

[Production of Cellulose Acetate Composition]

The cellulose acetate composition of the present disclosure can be produced by adding a citrate ester-based plasticizer to a cellulose acetate having a degree of acetyl substitution of 0.4 or greater and less than 1.4.

The cellulose acetate can be produced, for example, by (A) hydrolysis (aging) of a cellulose acetate having a medium to high degree of substitution, (B) precipitation, and, if necessary, (C) washing and neutralization.

((A) Hydrolysis (Aging))

In this step, a cellulose acetate having a medium to high degree of substitution (hereinafter, sometimes referred to as "raw material cellulose acetate") is hydrolyzed.

The degree of acetyl substitution of the cellulose acetate with a medium to high degree of substitution, which is used as a raw material, is for example from 1.5 to 3, and preferably from 2 to 3.

The hydrolysis reaction can be performed by reacting the raw material cellulose acetate with water in the presence of a catalyst (aging catalyst) in an organic solvent. Examples of the organic solvent include acetic acid, acetone, alcohol (such as methanol), and mixed solvents thereof. A catalyst commonly used as a deacetylation catalyst can be used as the catalyst. The catalyst is particularly preferably sulfuric acid.

The amount of the organic solvent (e.g., acetic acid) to be used is, for example, from 0.5 to 50 parts by weight, per 1 part by weight of the raw material cellulose acetate.

The amount of the catalyst (e.g., sulfuric acid) to be used is, for example, from 0.005 to 1 part(s) by weight, per 1 part by weight of the raw material cellulose acetate.

The amount of water in the hydrolysis is, for example, from 0.5 to 20 parts by weight, per 1 part by weight of the raw material cellulose acetate. Also, the amount of the water is, for example, from 0.1 to 5 parts by weight, per 1 part by weight of the organic solvent (e.g., acetic acid).

The reaction temperature in the hydrolysis is, for example, from 40 to 130° C.

((B) Precipitation)

In this step, after the completion of the hydrolysis reaction, the temperature of the reaction system is cooled to room temperature, and the precipitation solvent is added to precipitate a cellulose acetate having a low degree of substitution. An organic solvent miscible with water or an organic solvent having a high solubility in water can be used as the precipitation solvent. Examples of the precipitation solvent include ketones such as acetone and methyl ethyl ketone; and alcohols such as methanol, ethanol, and isopropyl alcohol.

When a mixed solvent containing two or more types of the solvents is used as the precipitation solvent, similar effects to those obtained by precipitation fractionation which will be described below can be obtained, and a cellulose acetate with a narrow compositional distribution (intermolecular substitution degree distribution), a small compositional distribution index (CDI) and a low degree of substitution can be obtained.

Furthermore, precipitation fractionation (fractional precipitation) and/or dissolution fractionation (fractional dissolution) is applied to the cellulose acetate with a low degree of substitution obtained by precipitation, and thus a cellulose acetate having a narrow compositional distribution (intermolecular substitution degree distribution), a very small compositional distribution index CDI, and a low degree of substitution can be obtained.

The precipitation fractionation can be performed, for example, by dissolving a cellulose acetate (solid matter) with a low degree of substitution obtained by precipitation in water or a mixed solvent of water or a hydrophilic solvent (for example, acetone) to form an aqueous solution having an appropriate concentration (for example, from 2 to 10 wt. %, preferably from 3 to 8 wt. %); adding a poor solvent to the aqueous solution (or adding the aqueous solution to a poor solvent); holding the solution at an appropriate temperature (for example, 30° C. or lower, preferably 20° C. or lower) to precipitate a cellulose acetate having a low degree of substitution; and collecting the resulting precipitate.

((C) Washing and Neutralization)

The precipitate (solid matter) obtained in the precipitation (B) is preferably washed with an organic solvent (poor solvent), for example, an alcohol such as methanol or a ketone such as acetone. It is also preferable to wash and neutralize the precipitate with an organic solvent containing a basic substance (for example, an alcohol such as methanol or a ketone such as acetone). The washing and neutralization can efficiently remove impurities including the catalyst used in the hydrolysis (such as sulfuric acid).

Examples of substances which can be used as the basic substance include alkali metal compounds (for example, alkali metal hydroxides such as sodium hydroxide and potassium hydroxide), and alkaline earth metal compounds (for example, alkaline earth metal carboxylates such as calcium acetate).

(Addition of Citrate Ester-Based Plasticizer)

When the citrate ester-based plasticizer is added to the obtained cellulose acetate, the cellulose acetate and the citrate ester-based plasticizer are preferably mixed, and the mixing can be performed by a mixer such as a planetary mill, a Henschel mixer, a vibration mill, a ball mill, or the like. It is preferable to use a Henschel mixer because it enables homogeneous mixing dispersion in a short period of time. In addition, the degree of mixing is not particularly limited. For example, in the case of a Henschel mixer, the mixture is performed preferably for a period of time ranging from 10 minutes to 1 hour.

Furthermore, drying can be performed after mixing of the cellulose acetate and the citrate ester-based plasticizer. Examples of the drying method include drying by allowing the mixture to stand for a period of time ranging from 1 to 48 hours at 50 to 105° C.

As another method for adding the citrate ester-based plasticizer to the obtained cellulose acetate, a method in which the cellulose acetate and the glycerin ester-based plasticizer are dissolved in a common good solvent, mixed uniformly, and the solvent is volatilized, may be employed.

Examples of the common good solvent include water and a mixed solvent of methylene chloride/methanol (weight ratio: 9:1).

Colorants, heat stabilizers, antioxidants, UV absorbers, and the like can be added depending on the intended use and specification of the molded article, at the time of mixing the cellulose acetate and the citrate ester-based plasticizer.

[Molded Article]

The molded article of the present disclosure is formed by molding the cellulose acetate composition. The form of the molded article is not particularly limited, and examples include a one-dimensional molded article, such as fibers; a two-dimensional molded article, such as films; and a three-dimensional molded article, such as pellets, tubes, and hollow cylindrical shapes.

In the production of a one-dimensional molded article such as fibers, the molded article can be obtained by spinning the cellulose acetate composition of the present disclosure. Examples of the spinning method include melt spinning (including melt blown spinning).

For example, a fibrous cellulose acetate composite molded article can be obtained by: heat-melting the cellulose acetate composition (such as pellets) in a known melt extrusion spinning machine; then 1) spinning it from a spinneret, and stretching continuous long fiber filaments that have been spun by an ejector with the aid of high-velocity and high-pressure air stream and winding them up; or 2) opening the filaments and collecting them on a support surface for collection to form a web. In addition, a nonwoven fabric can be produced by blowing out the cellulose acetate composition that has been melted by an extruder from a die having, for example, hundreds to thousands of spinnerets per meter in the width direction; collecting the stretched fibrous resin on a conveyor, and allowing the fibers to entangle and fuse during the collection (melt blown spinning). The spinning temperature during melt spinning is for example from 130 to 240° C., preferably from 140 to 200° C., and more preferably from 150 to 188° C. If the spinning temperature is too high, the molded article is remarkably colored. Furthermore, if the spinning temperature is too low, the viscosity of the composition becomes low, and it becomes difficult to increase the spinning draft ratio. Thus, the productivity tends to decline. For example, the spinning draft ratio is, approximately, from 200 to 600.

The fineness of the yarn obtained by the melt spinning method described above is for example from 20 to 800 denier (d), and preferably from 40 to 800 denier (d).

In particular, when the yarn is used as a cellulose acetate tow filter of a cigarette for use in heated tobacco products, the fineness thereof may be from 20 to 600 denier (d). Unlike known cigarettes, the heated tobacco products do not involve burning of the tobacco and therefore do not require removal of by-products that would be generated with burning. Thus, the filtration performance (property) of the cellulose acetate tow filter of the cigarette used in heated tobacco products may be much lower than filters used in known cigarettes. Note that the production of a hollow cellulose acetate tube of the cigarette used in the heated tobacco product from a tow requires a long time for the production process including molding into a hollow shape, and may cause an increase in production cost. There is also a technique of increasing the denier of the tow fibers (increasing the thickness of the fibers) for the purpose of achieving low filtration of the filter, but the production of thick denier tow fibers by known dry spinning is technically limited in terms of thickness. That is, if the thickness is too large, the solvent in the central portion will not volatilize, so the shape of the yarn will not be stabilized. The tow can hardly fulfill the future demand for further low filtration filters for heated tobacco products. Thus, a thick tow produced by melt spinning may be used, or a three-dimensional molded article may be formed, as will be described below.

Next, in the production of a two-dimensional molded article such as a film, a method of melt film formation can be employed. Examples of the method of melt film formation include extrusion molding and blow molding. Specifically, in the extrusion molding, a film or sheet can be produced, for example, by melt-kneading the cellulose acetate composition of the present disclosure using an extruder such as a single screw or twin screw extruder, extruding the composition into molding it into a film form from a slit in a die, and then cooling the resulting product.

The thickness of the film obtained by the method of melt film formation is for example from 1 μm to 1000 μm, preferably from 5 μm to 500 μm, and more preferably from 10 μm to 250 μm. In particular, when the film is used as a cooling element for cigarettes for use in heated tobacco products, the thickness of the film may be from 15 μm to 200 μm, from 20 to 150 μm, 25 to 100 μm, or from 35 to 70 μm. Because the amount of nicotine that diffuses in the air upon heating of tobacco leaves is small as compared with that of known cigarettes, nicotine must be delivered (distributed) to smokers (people who use heated tobacco products) without any loss. Also, in the case of heated tobacco products in which tobacco leaves are heated, nicotine is included in droplets in the aerosol, but the droplets are too hot to be inhaled by a user, and thus must be cooled in advance. To meet these requirements, the thickness of the film may be in the range described above.

Furthermore, in the production of a three-dimensional molded article such as a hollow cylindrical shape, it can be produced by thermoforming. Specifically, a desired three-dimensional molded article including hollow cylindrical shapes can be produced, for example, by heat compression molding, melt extrusion molding, and injection molding of the cellulose acetate composition of the present disclosure in the form of pellets. For example, an injection molding machine, Micro-1, available from Meiho Co., Ltd., a heat compression molding machine for molding FRP test pieces, ML-48, available from Maruto Testing Machine Company, and the like may be used as the device. The heating temperature at the time of molding may be in the range of from 240 to 180° C., and the amounts of additives to be added including the citrate ester-based plasticizer may be adjusted as appropriate.

The method for preparing the cellulose acetate composition of the present disclosure in the form of pellets is not particularly limited, and examples thereof include a method of, first, preparing the cellulose acetate and citrate ester-based plasticizer of the present disclosure through dry or wet pre-mixing using mixers such as a tumbler mixer, a Henschel mixer, a ribbon mixer, and a kneader; then melt-kneading them in an extruder such as a single or twin screw extruder, extruding the melt-kneaded product into the form of strands; and cutting the strands to prepare the cellulose acetate composition in the form of pellets.

The specific method for forming a three-dimensional molded article from the cellulose acetate composition of the present disclosure in the form of pellets by melt extrusion molding is not particularly limited. For example, injection molding, extrusion molding, vacuum molding, profile molding, foam molding, injection press, press molding, blow molding, gas injection molding, and the like can be used.

As described above, there is the method in which the cellulose acetate and citrate ester-based plasticizer of the present disclosure are melt-kneaded in an extruder to prepare pellets and then to form a molded article. Additionally, the desired three-dimensional molded article including hollow cylindrical shapes can be produced by depositing the citrate ester-based plasticizer to surfaces of cellulose acetate flakes, and heating the material, and performing compression-molding on the heated material.

The compression molding may be performed using a commercially available compression molding machine at a temperature of from 150° C. to 240° C. and desirably 230° C., and a pressure of 0.01 MPa or higher and desirably 0.5 MPa for 30 seconds or more and desirably approximately 2 minutes. The "cellulose ester flakes" refers to a flake-shaped cellulose ester obtained by acetylating the cellulose, then performing a hydrolysis reaction to adjust the average degree of substitution, and purifying and drying the reaction product.

The three-dimensional molded article in the form of a hollow cylindrical shape may be used as it is as a hollow cellulose acetate tube of a cigarette for use in heated tobacco products, or may be a long member before cutting, which can be cut in the direction orthogonal to the axial direction to provide a hollow cellulose acetate tube of a cigarette for use in heated tobacco products.

EXAMPLES

Hereinafter, the present invention will be specifically described with reference to examples, but the technical scope of the present invention is not limited by these examples.

Each physical property of Examples and Comparative Examples described below were evaluated according to the following methods.

<Degree of Acetyl Substitution, Weight Average Molecular Weight (Mw), Number Average Molecular Weight (Mn), and Compositional Distribution Index CDI>

The degree of acetyl substitution, weight average molecular weight (Mw), number average molecular weight (Mn), and compositional distribution index CDI were determined by the methods described above.

<Thermoformability Evaluation>

The thermoformability was evaluated by the following method. In the respective Examples and Comparative Examples except for Comparative Example 3, each sample was dissolved in pure water in a ratio of 5 parts by weight of pure water per 1 part by weight of the sample, and solution casting was performed using a glass substrate to prepare a film having a thickness of approximately 120 μm. In Comparative Example 3, a mixed solvent of acetone/water (weight ratio: 9:1) was used in place of pure water as the solvent. A sample was dissolved in the solvent in a ratio of 5 parts by weight of the solvent per 1 part by weight of the sample, and a film was prepared by solution casting in the same manner as described above. A sample having a size of 0.3 cm×1 cm was cut from each of the prepared films, and used as a sample for evaluation.

A small heat press machine HC300-01 (available from AS ONE Corporation) was used to heat and pressurize the sample under the following conditions:
Set heating temperature: 150° C.; 175° C.; 200° C.; 225° C.
Press pressure: 14.14 MPa
Heating and pressurization time: 2 min After heating and pressurization, the melting state of the sample was confirmed, and thus the thermoformability was evaluated based on the following criteria. When the sample was melted, it was suggested that the plasticity was imparted.
  1: The sample was completely unmelted, and the respective test pieces were fused (in other words, the fused portion was 0%).
  2: The sample was partly melted, and the overlapping portion of the respective test pieces were partially fused (in other words, the fused portion was approximately 30%).
  3: The sample was more than half melted, and more than half of the overlapping portion of the respective test pieces was fused.

<Biodegradability>

The biodegradability was evaluated by a method of measuring the degree of biodegradation using activated sludge in accordance with JIS K6950. The activated sludge was obtained from the Tatara River purification center in Fukuoka prefecture. About 300 mL of a supernatant (activated sludge concentration: about 360 ppm) obtained by allowing the activated sludge to stand for approximately 1 hour was used per culture bottle. The measurement was started when 30 mg of the sample was stirred in the supernatant, and then the sample was measured every 24 hours until after 720 hours, that is until after 30 days, a total of 31 times. Details of the measurement are as follows. The biochemical oxygen demand (BOD) in each culture bottle was measured using a Coulometer 0M3001 available from Ohkura Electric Co., Ltd. The percentage of the biochemical oxygen demand (BOD) to the theoretical biochemical oxygen demand (BOD) for complete degradation based on the chemical composition of each sample was taken as the degree of biodegradation (wt. %). The biodegradability was evaluated based on measurement data up to 240 hours in this measurement.

<Water Solubility Evaluation>

The water solubility was evaluated by the following method. A sample having a size of 2 cm×2 cm was cut from each of the films prepared for the thermoforming evaluation, and used as samples for water solubility evaluation.

The film sample was placed in a 100-ml size bottle containing 80 ml of pure water, and the bottle was rotated at a rotational speed of 14 rpm with a rotating machine, and changes in the shape and weight of the film sample over time were evaluated. The shape was observed by the naked eye. The weight was determined as follows. The film sample was taken out from pure water, and water droplets were wiped off. The film sample was dried in a dryer at 105° C. for 1 hour, and then weighed using an analytical precision electronic balance. The amount (%) of weight change from the weight of the film sample at the start of the rotation was determined. The criteria for evaluation shown in Table 1 are as follows.
  Poor: At one (1) hour after the start of the rotation, the film sample was not damaged or deformed, and showed a decrease of less than 10% in the amount of weight change.

Marginal: At one (1) hour after the start of the rotation, the film sample showed a decrease of less than 10% in the amount of weight change, but was damaged or deformed; or, the film sample was not damaged or deformed, but showed a decrease of 10% or greater in the amount of weight change.

Good: The film sample was entirely dissolved within 1 hour from the start of the rotation.

Production Example 1

To 1 part by weight of a raw material cellulose acetate (trade name: "L-50" available from Daicel Corporation; total degree of acetyl substitution: 2.43; 6% viscosity: 110 mPa·s), 5.1 parts by weight of acetic acid and 2.0 parts by weight of water were added. The mixture was stirred for 3 hours to dissolve the cellulose acetate. To this solution, 0.13 parts by weight of sulfuric acid was added. The resulting solution was held at 100° C. and hydrolyzed. For the purpose of preventing the cellulose acetate from precipitating during the hydrolysis, water was added to the system in two portions. Specifically, 0.25 hours after the start of the reaction, 0.67 parts by weight of water was added to the system over 5 minutes. After 0.5 hours, 1.33 parts by weight of water was further added to the system over 10 minutes, and the mixture was reacted for additional 1.25 hours. The total hydrolysis time is 2 hours. A step ranging from the start of the reaction to the first addition of water is referred to as first hydrolysis (first aging). A step ranging from the first addition of water to the second addition of water is referred to as second hydrolysis (second aging). A step ranging from the second addition of water to the end of the reaction is referred to as third hydrolysis (third aging).

After the hydrolysis was performed, the temperature of the system was cooled to room temperature (about 25° C.), and 15 parts by weight of the precipitated solvent (methanol) was added to the reaction mixture to form a precipitate.

The precipitate was collected as a wet cake with a solid content of 15 wt. %. Eight (8) parts by weight of methanol was added, and the precipitate was subjected to liquid removal to a solid content of 15 wt. % and thus washed. The procedures were repeated three times. The washed precipitate was further washed twice with 8 parts by weight of methanol containing 0.004 wt. % of potassium acetate, neutralized, and dried to yield a cellulose acetate having a degree of acetyl substitution of 0.87. The degree of acetyl substitution, weight average molecular weight (Mw), number average molecular weight (Mn), and compositional distribution index (CDI) of the obtained cellulose acetate were measured. The results are shown in Table 1.

Example 1

In 500 parts by weight of pure water as a solvent, 95 parts by weight of the cellulose acetate with a degree of acetyl substitution of 0.87 obtained in Production Example 1 and 5 parts by weight of triethyl citrate as a citrate ester-based plasticizer were dissolved, and mixed uniformly. Next, the conditions were changed sequentially as follows: for 3 minutes at room temperature, for 30 minutes in a dryer set to a temperature of 45° C., and then for 30 minutes in a dryer set to a temperature of 150° C., and the solvent was volatilized to yield a cellulose acetate composition.

The thermoformability, biodegradability and water solubility of the obtained cellulose acetate composition were evaluated by the methods described above. The results are shown in Table 1.

Examples 2 to 4

A cellulose acetate composition was obtained in the same manner as in Example 1, except that the amounts of the cellulose acetate with a degree of acetyl substitution of 0.87 obtained by Production Example 1 and triethyl citrate were changed to those shown in Table 1, respectively.

The thermoformability, biodegradability and water solubility of the obtained cellulose acetate composition were evaluated by the methods described above. The results are shown in Tables 1 and 2 and illustrated in the FIGURE.

Comparative Example 1

A cellulose acetate composition was obtained in the same manner as in Example 1, except that the amounts of the cellulose acetate with a degree of acetyl substitution of 0.87 obtained in Production Example 1 and triethyl citrate were changed to those shown in Table 1.

The thermoformability, biodegradability and water solubility of the obtained cellulose acetate composition were evaluated by the methods described above. The results are shown in Table 1.

Comparative Example 2

In 100 parts by weight of pure water as a solvent, 100 parts by weight of the cellulose acetate with a degree of acetyl substitution of 0.87 obtained in Production Example 1 was dissolved, and mixed uniformly. The conditions were changed sequentially as follows: for 3 minutes at room temperature, for 30 minutes in a dryer set to a temperature of 45° C., and then for 30 minutes in a dryer set to a temperature of 150° C., and the solvent was volatilized.

The thermoformability, biodegradability and water solubility of the obtained product were evaluated by the methods described above. The results are shown in Tables 1 and 2 and illustrated in the FIGURE.

Production Example 2

To 1 part by weight of a raw material cellulose acetate (trade name: "L-50" available from Daicel Corporation; total degree of acetyl substitution: 2.43; 6% viscosity: 110 mPa·s), 5.1 parts by weight of acetic acid and 2.0 parts by weight of water were added. The mixture was stirred for 3 hours to dissolve the cellulose acetate. To this solution, 0.13 parts by weight of sulfuric acid was added. The resulting solution was held at 95° C. and hydrolyzed. For the purpose of preventing the cellulose acetate from precipitating during the hydrolysis, water was added to the system in two portions. Specifically, 0.3 hours after the start of the reaction, 0.67 parts by weight of water was added to the system over 5 minutes. After 0.7 hours, 1.33 parts by weight of water was further added to the system over 10 minutes, and the mixture was reacted for additional 1.5 hours. The total hydrolysis time is 2.5 hours. A step ranging from the start of the reaction to the first addition of water is referred to as first hydrolysis (first aging). A step ranging from the first addition of water to the second addition of water is referred to as second hydrolysis (second aging). A step ranging from the second addition of water to the end of the reaction is referred to as third hydrolysis (third aging).

After the hydrolysis was performed, the temperature of the system was cooled to room temperature (about 25° C.), and 15 parts by weight of the precipitated solvent (methanol) was added to the reaction mixture to form a precipitate.

The precipitate was collected as a wet cake with a solid content of 15 wt. %. Eight (8) parts by weight of methanol was added, and the precipitate was subjected to liquid removal to a solid content of 15 wt. % and thus washed. The procedures were repeated three times. The washed precipitate was further washed twice with 8 parts by weight of methanol containing 0.004 wt. % of potassium acetate, neutralized, and dried to yield a cellulose acetate having a degree of acetyl substitution of 1.7. The degree of acetyl substitution, weight average molecular weight (Mw), number average molecular weight (Mn), and compositional distribution index (CDI) of the obtained cellulose acetate were measured. The results are shown in Table 1.

Comparative Example 3

In 500 parts by weight of a mixed solvent of methylene chloride/methanol (weight ratio: 9:1), 100 parts by weight of the cellulose acetate with a degree of acetyl substitution of 1.7 obtained in Production Example 2 was dissolved, and mixed uniformly. The conditions were changed sequentially as follows: for 3 minutes at room temperature, for 30 minutes in a dryer set to a temperature of 45° C., and then for 30 minutes in a dryer set to a temperature of 150° C., and the solvent was volatilized.

The thermoformability, biodegradability and water solubility of the obtained product were evaluated by the methods described above. The results are shown in Tables 1 and 2 and illustrated in the FIGURE.

Reference Example 1

In 500 parts by weight of a mixed solvent of methylene chloride/methanol (weight ratio: 9:1), 100 parts by weight of a cellulose acetate with a degree of acetyl substitution of 2.1 was dissolved, and mixed uniformly. The conditions were changed sequentially as follows: for 3 minutes at room temperature, for 30 minutes in a dryer set to a temperature of 45° C., and then for 30 minutes in a dryer set to a temperature of 150° C., and the solvent was volatilized.

The biodegradability of the obtained product was evaluated by the method described above. The results are illustrated in the FIGURE.

Reference Example 2

The biodegradability was evaluated in the same manner as in Reference Example 1, except that a cellulose acetate with a degree of acetyl substitution of 2.9 was used instead of the cellulose acetate with a degree of acetyl substitution of 2.1. The results are illustrated in the FIGURE.

TABLE 1

|  |  | Example 1 | Example 2 | Example 3 | Example 4 | Comparative Example 1 | Comparative Example 2 | Comparative Example 3 |
|---|---|---|---|---|---|---|---|---|
| Cellulose acetate | Degree of acetyl substitution |  |  |  | 0.87 |  |  | 1.7 |
|  | Weight average molecular weight (Mw) (×10^4) |  |  |  | 3.6 |  |  | 9.1 |
|  | Number average molecular weight (Mn) (×10^4) |  |  |  | 1.9 |  |  | 3.9 |
|  | Compositional distribution index (CDI) |  |  |  | 1.43 |  |  | 2.68 |
|  | Content (parts by weight) | 95 | 90 | 80 | 70 | 97.5 | 100 | 100 |
| Citrate ester-based plasticizer | Triethyl citrate | Content (parts by weight) | 5 | 10 | 20 | 30 | 2.5 | — | — |
| Thermoformability evaluation: (Melting level) | Set heating temperature | 150° C. | 1 | 1 | 1 | 1 | 1 | 1 | 1 |
|  |  | 175° C. | 1 | 1 | 1 | 2 | 1 | 1 | 1 |
|  |  | 200° C. | 2 | 2 | 3 | 3 | 1 | 1 | 1 |
|  |  | 225° C. | 3 | 3 | 3 | 3 | 1 | 1 | 1 |
| Biodegradability evaluation: Degree of biodegradation after 10 days (wt. %) |  | — | — | 73.9 | — | — | 75.1 | 40.5 |
| Water solubility evaluation: |  | — | — | Good | — | — | Good | Poor |

TABLE 2

| Time (h) elapsed from start of rotation | Amount (%) of weight change | | |
|---|---|---|---|
|  | Example 3 | Comparative Example 2 | Comparative Example 3 |
| 0 | 0.00 | 0.00 | 0.00 |
| 0.5 | −86.56 | −76.11 | −0.43 |
| 1 | −100.00 | −100.00 | 0.28 |
| 5 | −100.00 | −100.00 | −2.67 |
| 12 | −100.00 | −100.00 | −3.03 |
| 24 | −100.00 | −100.00 | −3.54 |

As shown in Table 1, since a cellulose acetate having a degree of acetyl substitution of 0.4 or greater and less than 1.4 was used in Comparative Examples 1 and 2, the obtained compositions had excellent biodegradability. However, the compositions contained triethyl citrate in a small amount or did not contain any triethyl citrate, and thus were not melted even by heating or pressurization at all and could not be thermoformed.

In Comparative Example 3, a cellulose acetate having a degree of acetyl substitution of 1.4 or greater was used, and the obtained composition did not contain any citrate ester-based plasticizer. Therefore, the composition was not melted even by heating or pressurization at all and could not be thermoformed. Furthermore, the product was inferior in water solubility.

On the other hand, it is understood that the cellulose acetate compositions of Examples 1 to 4 contain a cellulose acetate having a degree of acetyl substitution of 0.4 or greater and less than 1.4 and an appropriate amount of triethyl citrate, and thus have not only excellent biodegradability, but also excellent thermoformability, and even excellent water solubility.

The invention claimed is:

1. A cellulose acetate composition comprising:
   a cellulose acetate having a degree of acetyl substitution of 0.4 or greater and 1.1 or less; and
   a citrate ester-based plasticizer,
   wherein a content of the citrate ester-based plasticizer is 15 parts by weight or greater and 30 parts by weight or less per 100 parts by weight of the total amount of the cellulose acetate and the citrate ester-based plasticizer.

2. The cellulose acetate composition according to claim 1, wherein the citrate ester-based plasticizer is at least one type selected from the group consisting of triethyl citrate and acetyl triethyl citrate.

3. The cellulose acetate composition according to claim 1, wherein the cellulose acetate composition has a melting viscosity suitable for thermoforming at a temperature of 200° C. or higher.

4. A molded article formed by molding the cellulose acetate composition described in claim 1.

5. The molded article according to claim 4, wherein the molded article is a film.

6. The molded article according to claim 4, wherein the molded article has a hollow cylindrical shape.

7. The molded article according to claim 4, wherein the molded article is a cigarette member of a heated tobacco product.

* * * * *